(12) United States Patent
Izawa

(10) Patent No.: US 6,542,698 B2
(45) Date of Patent: Apr. 1, 2003

(54) SHADING HOOD FOR DIGITAL CAMERA HAVING LIQUID CRYSTAL SCREEN

(75) Inventor: Masao Izawa, Tokyo (JP)

(73) Assignee: Kakuyo Co., Ltd., Tokyo (JP)

( * ) Notice: Subject to any disclaimer, the term of this patent is extended or adjusted under 35 U.S.C. 154(b) by 0 days.

(21) Appl. No.: 09/846,323

(22) Filed: May 2, 2001

(65) Prior Publication Data

US 2002/0097997 A1 Jul. 25, 2002

(30) Foreign Application Priority Data

Jan. 19, 2001 (JP) ......................................... 2001-000171
Jan. 29, 2001 (JP) ......................................... 2001-000333

(51) Int. Cl.[7] ........................... G03B 17/18; G02B 23/16
(52) U.S. Cl. ....................................... 396/287; 359/612
(58) Field of Search ................................. 396/287, 374; 359/601, 609, 612; 348/842, 333.01

(56) References Cited

U.S. PATENT DOCUMENTS

| | | | | |
|---|---|---|---|---|
| 4,577,928 A | * | 3/1986 | Brown | 348/842 |
| 5,218,474 A | * | 6/1993 | Kirschner | 359/601 |
| 5,988,823 A | * | 11/1999 | Wong | 359/601 |
| 6,046,754 A | * | 4/2000 | Stanek | 348/842 |
| 6,144,419 A | * | 11/2000 | Schmidt | 348/842 |
| 6,419,367 B1 | * | 7/2002 | Dion et al. | 359/612 |

FOREIGN PATENT DOCUMENTS

| | | |
|---|---|---|
| JP | 05083608 | 4/1993 |
| JP | 10322575 | 12/1998 |

* cited by examiner

Primary Examiner—Christopher Mahoney
(74) Attorney, Agent, or Firm—Robert Kinberg; Venable, LLP

(57) ABSTRACT

A shading hood member for a digital camera, which can easily be attached to a liquid crystal monitor of a digital camera of the existing type, and which has a simple structure and is compact in size, and which can be manufactured at low cost, is disclosed. The shading hood member is detachably attached to the liquid crystal monitor in such a manner as to cover the periphery of the liquid crystal screen of the liquid crystal monitor that is openably provided on the outside surface of a camera body.

8 Claims, 8 Drawing Sheets

SHADING HOOD FOR DIGITAL CAMERA HAVING LIQUID CRYSTAL SCREEN

BACKGROUND OF THE INVENTION

1. Field of the Invention

The present invention relates to a shading hood for a digital camera having a liquid crystal monitor openably provided on an outside surface of a camera body or a digital camera having a liquid crystal monitor provided mainly on a back surface portion of a camera body.

2. Description of the Related Art

Hitherto, there has been provided such a kind of a shading hood according to techniques of respectively providing side-face hoods and a front-face hood in a collapsible manner onto three sides of a liquid crystal monitor, which is openably mounted on a rotating seat provided on an outside surface of a camera body, through hinges so that these hoods are adapted to be opened by being interlocked with an opening operation of the liquid crystal monitor, as disclosed in Japanese Unexamined Patent Application Publication No. 5-83608.

Further, there have been provided techniques of providing an optical viewfinder hood on a video camera in such a manner as to have a size and a shape that enable the hood to closely be fitted along the outer periphery of a liquid crystal monitor enabled to serve as an electronic viewfinder, and as to also have a rear portion, in which an eyepieces hood is formed, so that a user sees an image, which is displayed on the liquid crystal panel, through the eyepiece hood, as disclosed in Japanese Unexamined Patent Application Publication No. 10-322575.

However, in such conventionally proposed shading hoods, for instance, according to the techniques disclosed in Japanese Unexamined Patent Application Publication No. 5-83608, the camera body and the shading hood member are integrally formed in such a way as to be interlocked with each other. Moreover, even in the case that the shading hood is unnecessary, for example, in the case that the camera is used in dim light, such a shading hood member is always opened when the liquid crystal monitor is opened. Therefore, the conventional shading hood member has drawbacks in that the shading hood member is a hindrance to the photographing and monitoring of images, and that the mechanism of the shading hood member is complex, and that the cost of the camera increases.

Moreover, according to the techniques disclosed in Japanese Unexamined Patent Application Publication No. 10-322575, the optical viewfinder itself is formed in such a manner as to have a size and a shape that cause the hood to closely be fitted along the outer periphery of a liquid crystal monitor. Thus, the optical viewfinder to be fitted along the outer periphery of the monitor should be preliminarily formed in such a manner as to have accurate dimensions. Therefore, when the camera is manufactured, sufficient fitting accuracy is required. Additionally, the constitution of the camera becomes complex. Consequently, the cost thereof increases. Furthermore, only a single user looks at an image by one of his eyes through the eyepiece hood formed in the rear portion of the optical viewfinder. Thus, although the shading hood completely shuts out strong light, such as sunlight, a plurality of persons cannot simultaneously see an image displayed on a liquid crystal panel. Moreover, details of an object are out of focus, so that an image formed on a liquid crystal screen is very indistinct.

In recent years, digital cameras each including a liquid crystal monitor, which has a liquid crystal screen provided on a rear portion of a camera body and can be used as an electronic viewfinder, have come into wide use.

Hitherto, a method of closely fitting and attaching shading hood members along the outer periphery of the liquid crystal monitor has been employed so as to enable a plurality of persons to simultaneously see a sharp image displayed on a liquid crystal screen by reliably shading incident external light in a camera of such a kind.

However, such a conventionally proposed digital camera has the following drawbacks. That is, attaching portions, such as a to-be-fitted groove portion mating with the outside shape of the shading hood member itself, for allowing the shading hood member to closely be fitted therearound should be formed along the outer periphery of the liquid crystal monitor. Moreover, at that time, unless the dimensions of the to-be-fitted groove to be formed along the outer circumference of the liquid crystal monitor should be preliminarily and accurately set, there is a fear that the shading hood member is incompletely attached thereto and becomes easy to come off. Furthermore, when a digital camera is manufactured, a redundant step of forming a to-be-fitted groove portion in a camera body itself is added to a manufacturing process thereof. Additionally, because the shading hood member requires the fitting accuracy, the cost of the camera increases.

U.S. Pat. No. 6,144,419, entitled "Collapsible Glare Reduction Device For A Video Monitor" discloses that the device has a top panel, first and second panels. The top panel, first and second panels are openable to define a hood. Therefore, the user must constructs the hood while attaching it to a monitor. The hood is secured by securing means to a monitor. The securing means must have been attached around the monitor beforehand.

SUMMARY OF THE INVENTION

The invention is created in view of the aforementioned circumstances of the conventional shading hood. Accordingly, an object of the invention is to provide a shading hood for a digital camera having a liquid crystal screen, which can easily be attached to a liquid crystal monitor of a digital camera of the existing type, if necessary, and which thus can be provided for all models of digital cameras and which has a simple structure and is compact in size, as compared with the conventional integral hood structure, and which can be manufactured at low cost and reliably shade external incident light, and which enables a plurality of persons to simultaneously see a clear and sharp image displayed on the liquid crystal screen.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1:
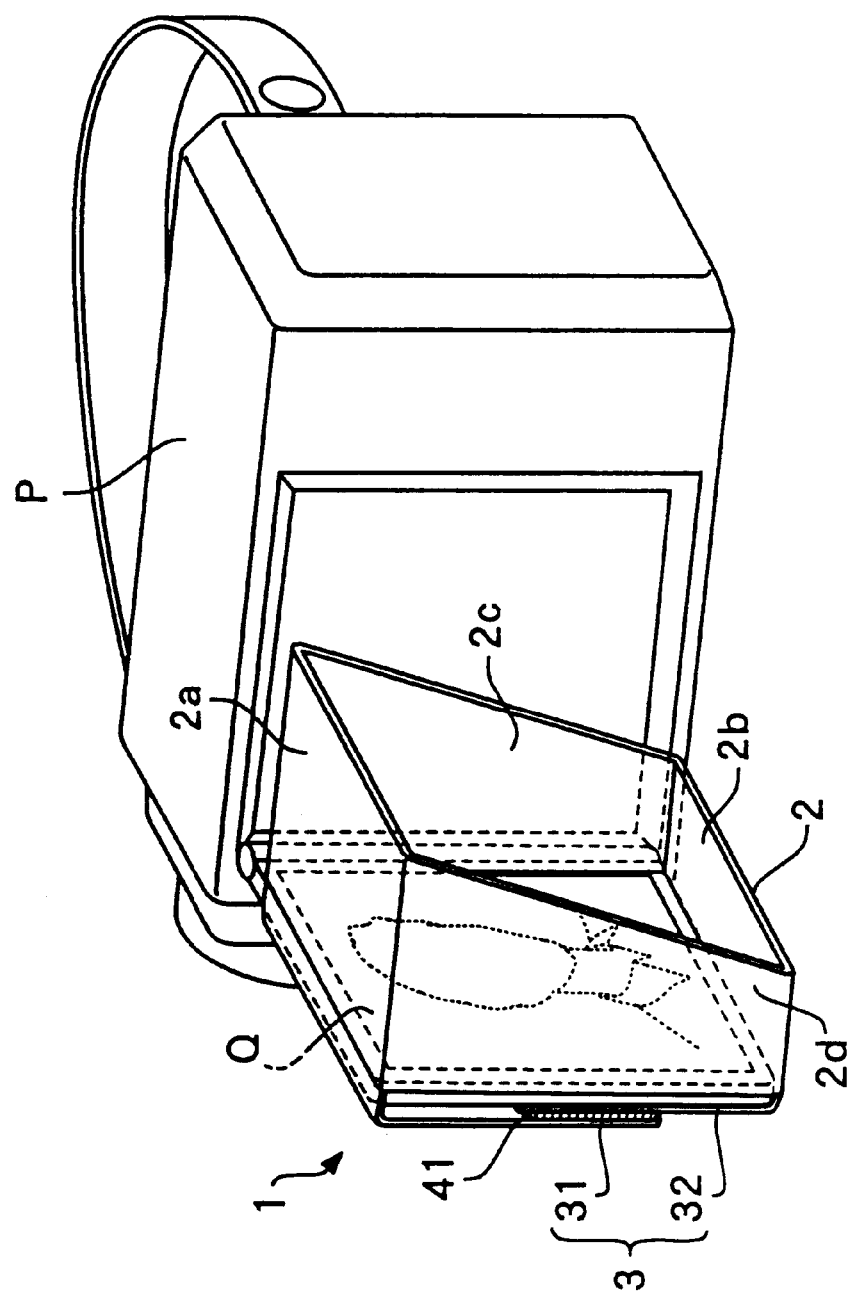
FIG. 1 is a schematic perspective view of a digital camera to which a shading hood member according to a first embodiment of the invention is attached.
Figure 2A:
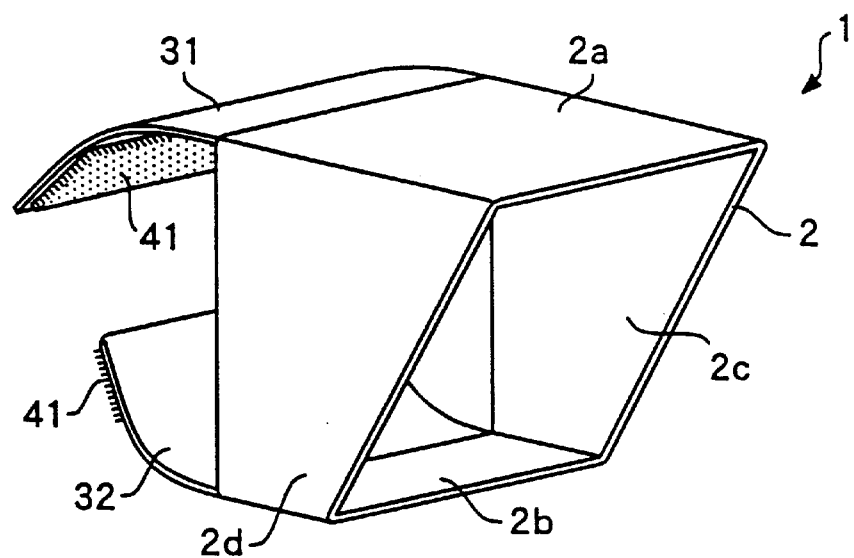
FIG. 2A is a perspective view of the shading hood member put into a state, in which the hood member is not attached thereto yet, for illustrating a method of using the shading hood member according to the first embodiment of the invention.
Figure 2B:
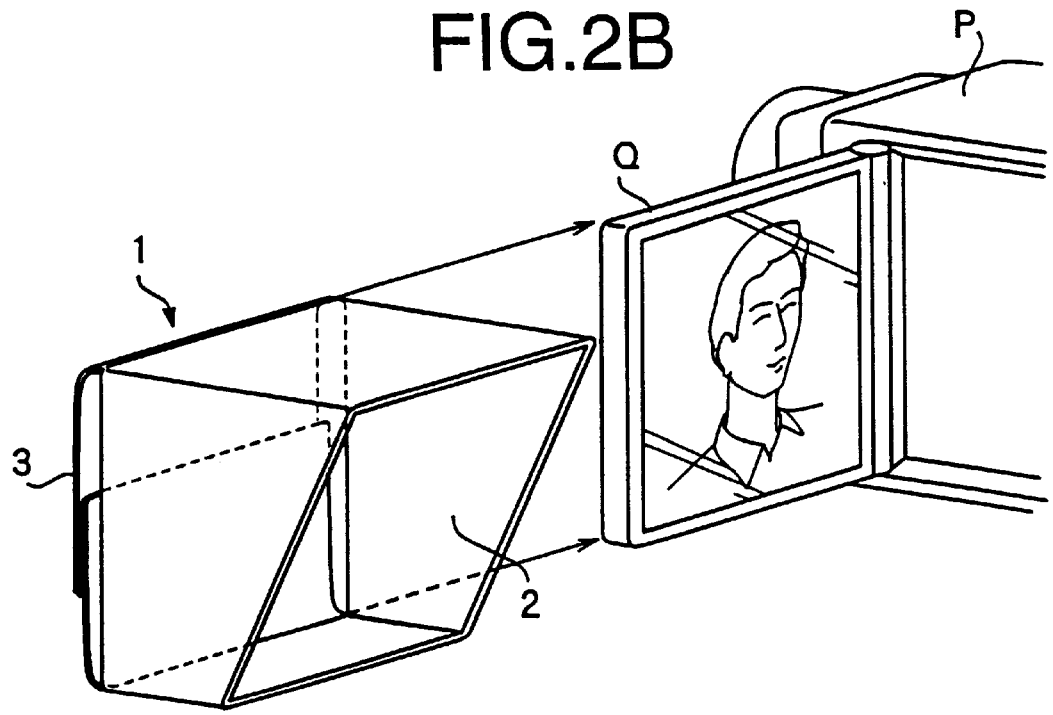
FIG. 2B is a perspective view illustrating a state in which the shading hood member according to the first embodiment of the invention is attached to the liquid crystal monitor.

In a first embodiment of the present invention illustrated in FIGS. 1, 2A, and 2B, reference numeral 1 designates a portable shading hood member 1 formed in such a way as to be compact in size so as to be enabled to be used mainly on a camera body P of a digital camera of the existing type having a liquid crystal monitor Q. This shading hood member 1 is used by being detachably attached to the liquid crystal monitor Q so as to cover the periphery of the liquid crystal screen of the liquid crystal monitor Q that is openably supported on the left side surface of the camera body P through a universal joint, as viewed in these figures.

The shading hood member 1 has a shading wall portion 2 made of a flexible synthetic resin, and also has a fixing means 3 made of a flexible synthetic resin for causing the liquid crystal monitor to hold the shading wall portion 2 itself. That is, the shading wall portion 2 is formed by respectively connecting the lateral edge portions of a nearly square like upper wall portion 2a to the lateral edge portions of a nearly transversely elongated lower wall portion 2b through nearly inverse trapezoid like left and right side wall portions 2c and 2d, so that the entire shading wall portion 2 formed in this manner is shaped nearly like a rectangular cylinder. Thus, a rear-end opening surface of the shading hood member 1 is formed like a rectangle in such a way as to be parallel to the rectangular liquid crystal screen of the liquid crystal monitor and as to have a transverse section, whose contour corresponds to and matches the contour of the liquid crystal screen. Further, the shading hood member 1 is formed so that the front-end opening surface side, through which a user looks at an image, thereof is inclined slightly downwardly. Incidentally, a black cotton cloth material is stuck to the inner surface of the shading wall portion 2 to thereby prevent diffused reflection of luminant light rays that are radiated from the liquid crystal screen.

Moreover, the fixing means 3 is implemented by holding/abutting surface portions 31 and 32 adapted to hang across the rear surface of the liquid crystal monitor 2, which are formed in such a way as to respectively hang in a direction from an upper wall portion to a lower wall portion and in an opposite direction at the rear-end opening surface side of the shading wall portion 2 so that the shading wall portion 2 can be inserted from a lateral direction into the liquid crystal monitor Q opened outwardly from the camera body P. That is, as illustrated in FIG. 2A, the fixing means 3 comprises the upper holding/abutting surface portion 31 extended from the band-plate-like upper wall portion, and the lower holding/abutting surface portion 32 extended from the band-plate-like lower wall portion, and a connecting means 41 annexed to the edge sides of these band-plate-like portions, which are provided at the rear-end opening surface side of the shading wall portion 2 so as to cause the liquid crystal monitor Q to hold the shading wall portion 2 itself. A space, into which the shading wall portion 2 can be inserted from a lateral side of the liquid crystal monitor Q, is formed among the holding/abutting surface portions 31 and 32 and the rear-end opening surface of the shading wall portion 2 by connecting the upper holding/abutting surface portion 31 and the lower holding/abutting surface portion 32 to each other at the rear-end opening surface side of the shading wall portion 2 through the connecting means 41.

Incidentally, the connecting means 41 is composed of, for example, male and female surface fasteners. However, the connecting means 41 may be constituted by another fixedly attaching that is one of a surface fastener, a snap fastener, a zipper slide fastener, and a hook member.

Next, an example of the use of the embodiment constructed as described above is described hereinbelow. As illustrated in FIG. 2A, the upper holding/abutting surface portion 31 and the lower holding/abutting surface portion 32 are connected to each other through the connecting means 41 at the rear-end opening surface side of the shading wall portion 2 of the shading hood member 1. As illustrated in FIG. 2B, the shading hood member 1 is attached to the liquid crystal monitor Q by inserting the liquid crystal monitor Q into the space formed among the holding/abutting portions 31 and 32 and the rear-end opening surface of the shading wall portion 2. Further, when the shading hood member 1 is not used, the connecting means 41 is disconnected therefrom. Then, the left and right side wall portions 2c and 2d of the shading wall portion 2 are folded compactly. Subsequently, the shading hood member 1 is accommodated into a storage case (not shown) dedicated to storage of a digital camera.

Figure 3A:
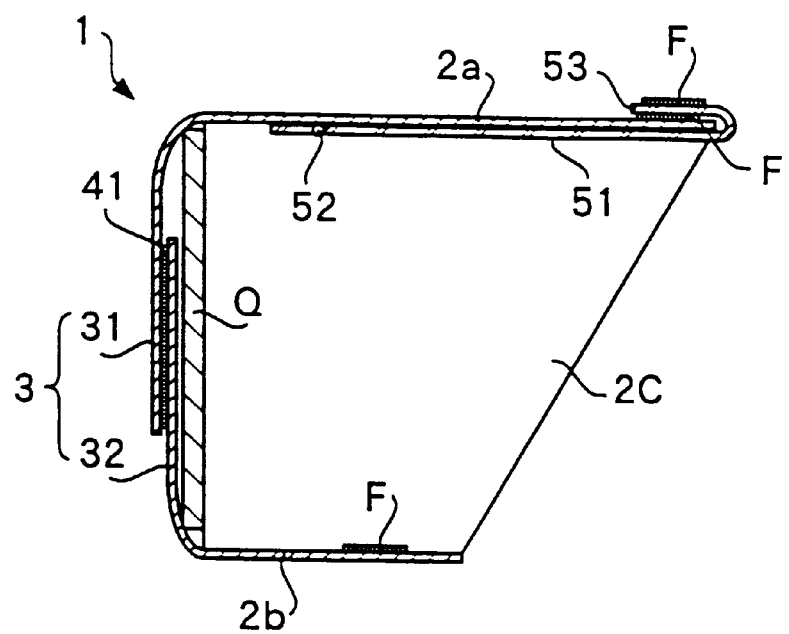
FIG. 3A is a sectional view of a shading hood member according to a second embodiment of the invention in a state in which a Fresnel lens is not used.
Figure 3B:
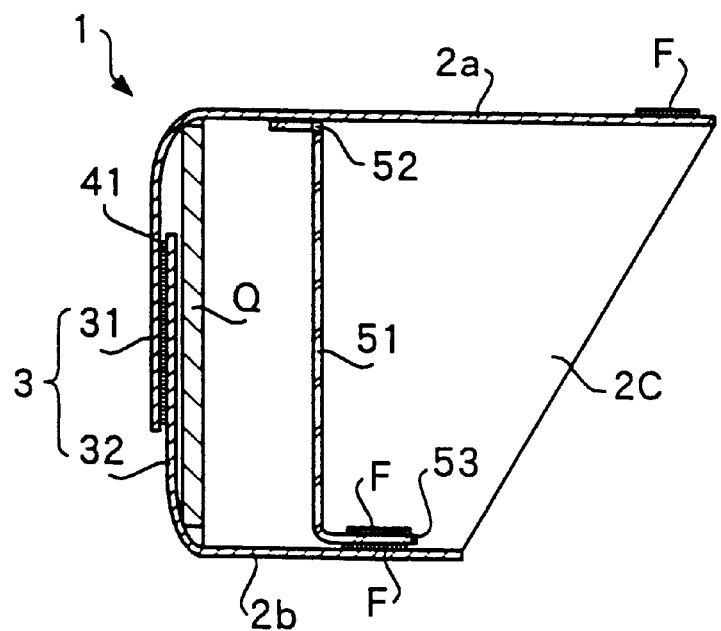
FIG. 3B is a sectional view of the shading hood member according to the second embodiment of the invention in a state in which a Fresnel lens is used.

Further, FIGS. 3A and 3B illustrate a second embodiment of the invention. Incidentally, constituent parts, which are the same as those of the first embodiment of the invention illustrated in FIGS. 1 and 2, are designated by reference characters used in these figures. Thus, the description of such constituent parts is omitted herein. In the second embodiment, a Fresnel lens 51, which has a size being equal to the area of the opening of the shading wall portion 2 and is enabled to retreat in a collapsed manner, is provided in the shading wall portion 2 of the shading hood member 1, which is the same as the shading wall portion of the first embodiment. This Fresnel lens 51 is of the known configuration in which fine circular grooves are formed in a surface portion of a plastic plate so that the entire plate serves as a lens.

That is, in the shading wall portion 2, the top end portion of the rectangular Fresnel lens 51 is rotatably and pivotably mounted in the rear-end opening surface part of the upper wall portion 2a through a hinge portion 52. A frontwardly foldable fixing piece 53 is formed at the bottom end portion of the Fresnel lens 51. Moreover, one of the male and female surface fastener portions F is formed on each of the top and bottom surfaces of the fixing piece 53. When the fixing piece 53 of the Fresnel lens 51 is turned toward the lower wall portion 2b through the hinge portion 52 so that the surface of the Fresnel lens 51 faces the inside of the rear-end opening surface part of the shading wall portion 2, the surface fastener portion F of the fixing piece 53 is fixedly attached to one of the male and female surface fasteners F, which is provided on the inner surface of the lower wall portion 2b (see FIG. 3B). Meanwhile, when the Fresnel lens 51 is folded toward the upper wall portion 2a through the hinge portion 52, the fixing piece 53 is folded back still more, so that the surface fastener portion F of the fixing piece 53 is fixedly attached to one of the male and female surface fastener parts F, which is provided on the top surface of the upper wall portion 2a (see FIG. 3A).

Thus, the Fresnel lens 51 provided in the shading hood member 1 serves to sharpen an image displayed on the liquid crystal screen by turning the fixing piece 53 toward the lower wall portion 2b through the hinge portion 52. Further, when the Fresnel lens 51 is not used, the Fresnel lens 51 itself is upwardly folded and retreated through the hinge portion 52 in the shading wall portion 2. Subsequently, the fixing piece 53 of the Fresnel lens 51 is folded toward the top surface side of the upper wall portion 2a and then fixedly attached to the surface fastener portion F. Thus, the liquid crystal screen can be directly seen over the shading hood member 1. Incidentally, instead of forming the surface fastener part F, a fixedly attaching portion, such as a snap fastener, a zipper slide fastener, or a hook member, may be provided.

As described above, according to the invention, there is provided a shading hood for a digital camera having a liquid crystal screen, which can easily be attached to a liquid crystal monitor of a digital camera of the existing type, if necessary, and which has a simple structure and is compact in size, as compared with the conventional integral hood structure, and which can be manufactured at low cost and reliably shade external incident light, and which enables a plurality of persons to simultaneously see a sharp image displayed on the liquid crystal screen.

That is, according to the invention, the shading hood member 1 is detachably attached to the liquid crystal monitor Q in such a manner as to cover the periphery of the liquid crystal screen of the liquid crystal monitor Q openably provided on the outside surface of the camera body P. Consequently, for example, external strong incident light, such as sunlight, can reliably be shut out. Moreover, a plurality of persons simultaneously can see a sharp image displayed on the liquid crystal screen.

The shading hood member 1 comprises the shading wall portion 2, which is formed nearly like a rectangular cylinder having a transverse section, whose contour corresponds to and matches the contour of the rectangular liquid crystal screen of the liquid crystal monitor Q, and also comprises the fixing means 3 formed at an opening end side of the shading wall portion 2 in such a way as to cause the liquid crystal monitor Q to hold the shading wall portion 2 itself. Thus, as compared with the conventional integral hood structure, the shading hood member 1 of the invention has a simple structure and is manufactured in such a manner as to be compact in size. Moreover, the low-cost shading hood member 1 can easily be provided.

The fixing means 3 is implemented by forming the holding/abutting surface portions 31 and 32, which are adapted to respectively hang in a direction from the upper wall portion to the lower wall portion and in an opposite direction, at an opening end side of the shading wall portion 2 so that the shading wall portion 2 can be inserted from a lateral side of the liquid crystal monitor Q opened outwardly from the camera body P. Consequently, the invention provides the shading hood member 1 that can easily be attached to and detached from the liquid crystal monitor Q opened outwardly from the camera body P, and that can easily be attached to a liquid crystal monitor of a digital camera of the existing type.

The holding/abutting surface portions 31 and 32 each have the upper holding/abutting surface portion 31, which is extended from the upper wall portion, and the lower holding/abutting surface portion 32, which is extended from the lower wall portion, and the connecting means 41 annexed to the edge parts of the portions 31 and 32. Consequently, the attachment of the shading wall portion 2 itself to the liquid crystal monitor Q and the detachment of the portion 2 itself from the monitor Q are facilitated.

Each of the connecting means 41 of the existing type are constituted by a fixedly attaching structure, such as a surface fastener, a snap fastener, a zipper slide fastener, or a hook member. Consequently, the holding/abutting surface portions 31 and 32 for facilitating the attachment of the shading wall portion 2 itself to the liquid crystal monitor Q and the detachment of the portion 2 itself from the monitor Q can be easily formed.

The shading hood member 1 is of the configuration including the Fresnel lens 51 that can be retreated in a collapsed manner in the shading wall portion 2. Thus, the use of the Fresnel lens enables users to see a clear image displayed on the liquid crystal screen. When the Fresnel lens 51 is not used, the liquid crystal screen can be directly viewed over the shading hood member 1 by retreating the Fresnel lens 51 in a collapsed manner in the shading wall portion 2.

Figure 4A:
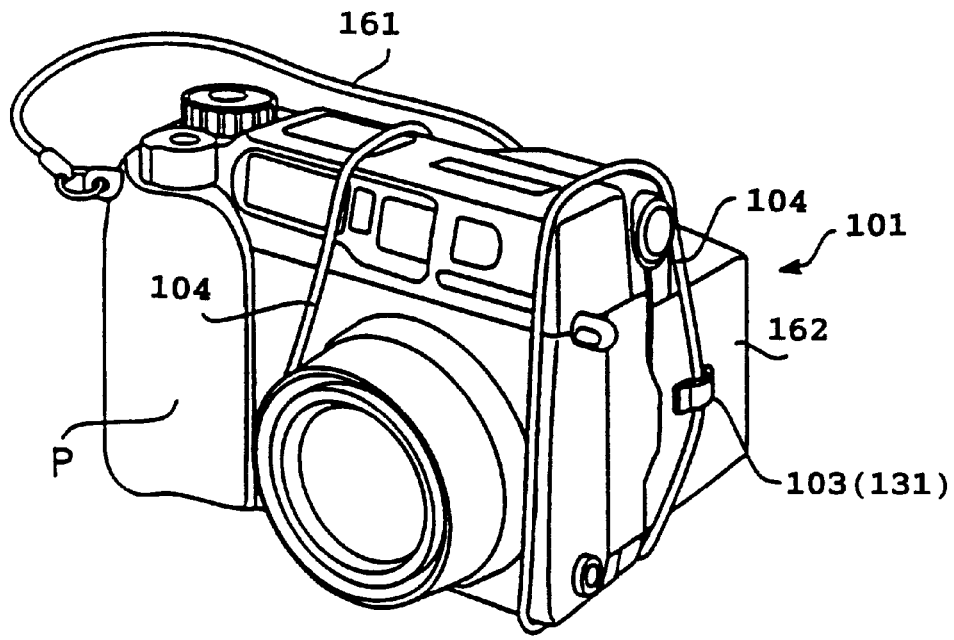
FIG. 4A is a perspective view of a digital camera, to which a shading hood member is attached, according to a third embodiment of the invention, which is viewed obliquely from the front thereof.
Figure 4B:
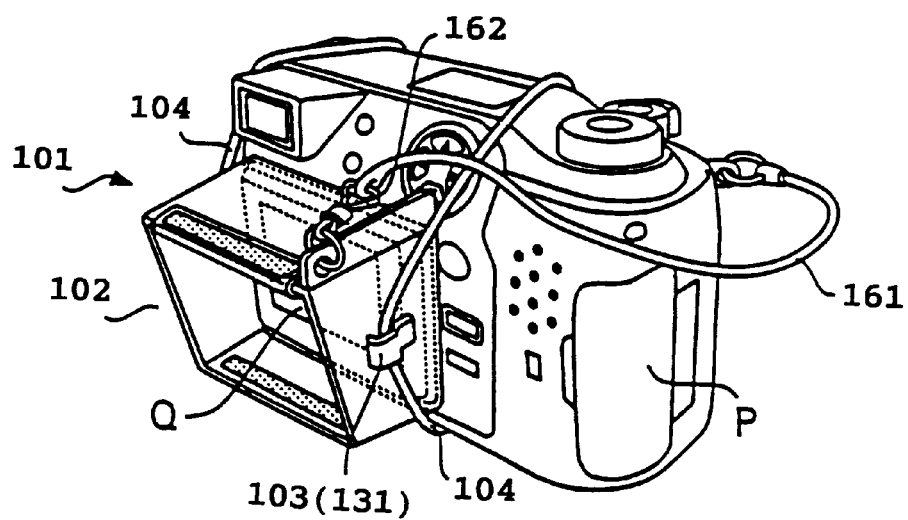
FIG. 4B is a perspective view of the digital camera, to which a shading hood member is attached, according to the third embodiment of the invention, which is viewed obliquely from the back thereof.
Figure 5:
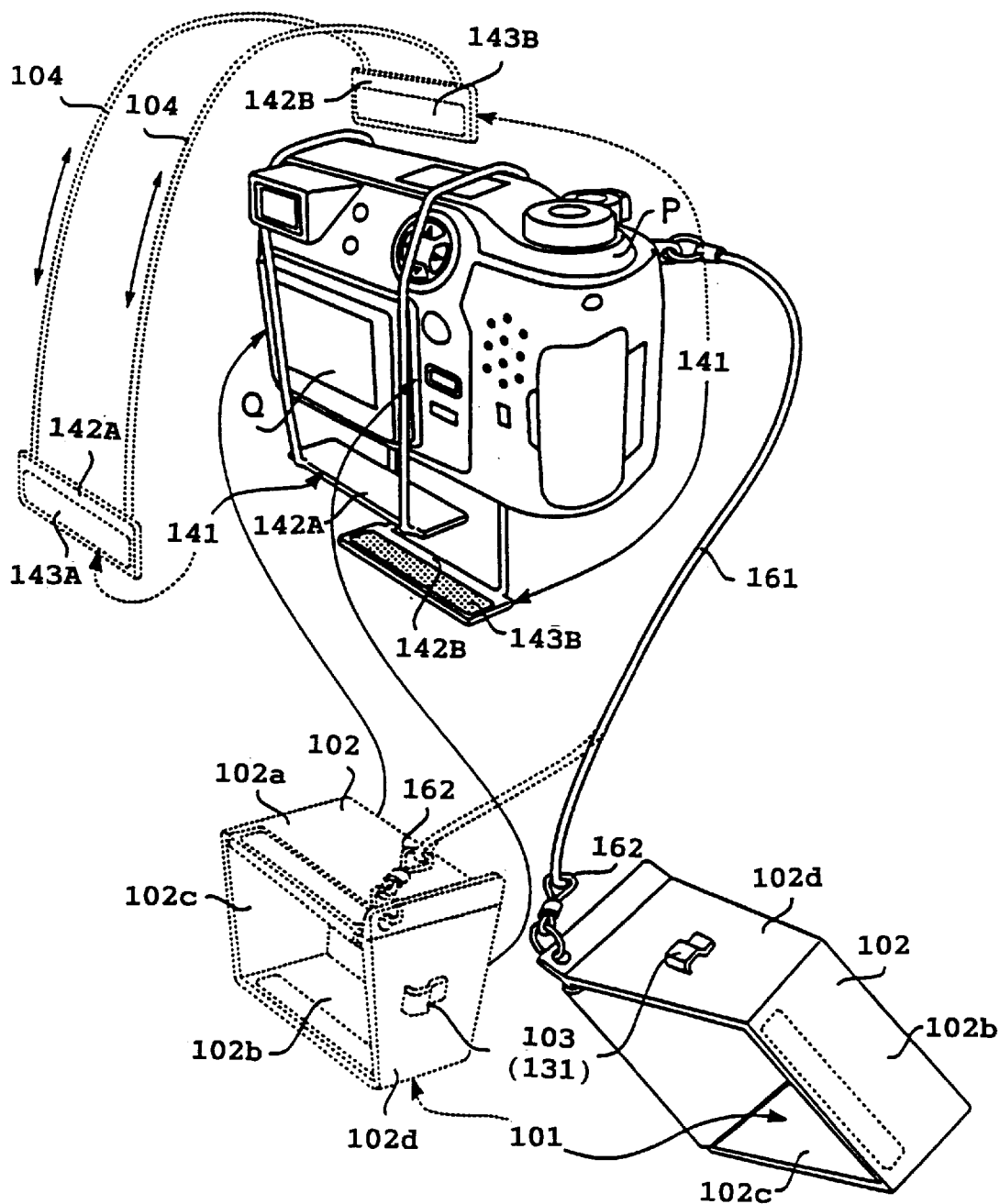
FIG. 5 is a perspective view illustrating a method of attaching the shading hood member according to the third embodiment of the invention.

FIGS. 4A to 5 illustrate a third embodiment of the invention. Reference numeral 101 designates a portable shading hood member 101 formed in such a way as to be compact in size so as to be able to be used in a digital camera of the existing type having the liquid crystal monitor Q provided on the rear surface of the camera P. This shading hood member 101 is used by preliminarily stretching and winding a pair of string members 104 around the camera body P, as illustrated in FIGS. 4A and 4B, in such a way as to cover the periphery of the liquid crystal screen of the liquid crystal monitor Q provided on the rear surface portion of the camera body P, and by subsequently and detachably being attached to the liquid crystal monitor Q through both the string members 104. Incidentally, the shading hood member 101 itself is enabled to be attached to a strap 161, which is attached to the camera body P, through a hook member 162 annexed to a corner portion of this member 101.

Each of the string members 104 are constituted by an elastic member, such as silicone rubber, having a length, which is slightly shorter than the length of the entire periphery of the camera body P, and also having heat resistance, water repellency, electrical nonconductivity, chemical resistance, and aging resistance. Moreover, the third embodiment of the invention has the connecting means 141 in which holding plate members 142A and 142B are connected to both ends of the two silicone rubber string members 104, and in which a male (or female) side surface fastener portion 143A is provided on the top surface of one of the holding plate members 142A, while a female (or male) side surface fastener portion 143B is provided on the bottom surface of the other holding plate member 142B. Furthermore, as illustrated in FIG. 5, the string members 104 are wound around the camera body P in such a way as to go around a camera operating member and a viewfinder. Then, both end portions of each of the string members 104 are connected through the connecting means 141 to both end portions of the other string member 104, respectively. Thus, the string members 104 are stretched and held at arbitrary tensile strength. Incidentally, the connecting means 141 are constituted by the male and female surface fasteners 143A and 143B. Instead, as illustrated in FIG. 5, the connecting means 141 may be constituted by what is called a snap fastener structure in which a plurality of projections 144A are disposed on the top surface of one 142A of the holding plate members, and in which a plurality of hole portions 144B are formed in the other holding plate member 142B correspondingly to the projections 144A, and in which the projections 144A are fitted into the hole portions 144B. Additionally, the connecting means 141 may be constituted by a fixedly attaching structure, such as a zipper slide fastener or a hook member.

The shading hood member 101 comprises a shading wall portion 102 made of flexible synthetic resin, and a fixing means 103 for causing the liquid crystal monitor Q to hold the string members 104 itself through the string members 104 preliminarily stretched and wound around the camera body P. That is, the shading wall portion 102 is formed so that the entire portion constructed by connecting the upper wall portion 102, the lower wall portion 102b, the left side wall portion 102c, and the right side wall portion 102d, which are nearly laterally elongated, to one another is shaped like a nearly rectangular cylinder. Thus, the rear end opening surface of the shading wall portion 102 is shaped like a rectangle, which is parallel to the rectangular liquid crystal screen of the liquid crystal monitor Q and which has a contour corresponding to and matching the contour of the liquid crystal screen of the monitor Q. Incidentally, a black cotton cloth material is stuck to the inner surface of the shading wall portion 2 to thereby prevent diffused reflection of luminant light rays that are radiated from the liquid crystal screen. Further, as illustrated in FIG. 5, an L-shaped hook claw-like string member hanging portion 131 is formed nearly at the center of each of the left and right side wall portions 102c and 102d as the fixing means 103, so that the string members 104 stretched and wound around the camera body P are latched and held by the string member hanging portion 131.

Alternatively, as illustrated in FIG. 5, the fixing means 103 may be constituted by forming each of cap-piece-like string member pinch-pressing/holding portions 132, to each of which the male and female surface fasteners are annexed, nearly at the center of each of the left and right side wall portions 102c and 102d and by then causing the string member pinch-pressing/holding portions 132 to respectively pinch-press and hold the string members 104 stretched and wound around the camera body P.

An example of a usage mode of the embodiment configured in the aforementioned manner is described hereinbelow. As illustrated in FIG. 5, the string members 104 are wound around the camera body P in such a way as to go around the operating member and the viewfinder. Both end portions of each of the string members 104 are connected through the connecting means 141 to both end portions of the other string member 104, respectively. Thus, the string members 104 themselves are stretched and held on the camera body P at given tensile strength. Further, the shading hood member 101 is closely attached to the liquid crystal monitor Q by causing the hook claw like string member hanging portions 131 of the left and right side wall portions 102c and 102d of the shading hood member 101 to latch and hold the left and right string members 104, which are stretched and wound around the camera body P. Furthermore, when the shading hood member 101 is not used, the connecting means 141 are disconnected therefrom. Then, the left and right side wall portions 102c and 102d of the shading wall portion are folded compactly. Subsequently, the shading hood member 101 is accommodated into a storage case (not shown) dedicated to storage of a digital camera. Alternatively, the shading hood member 101 may remain held on the camera body P through the strap 161.

Figure 6:
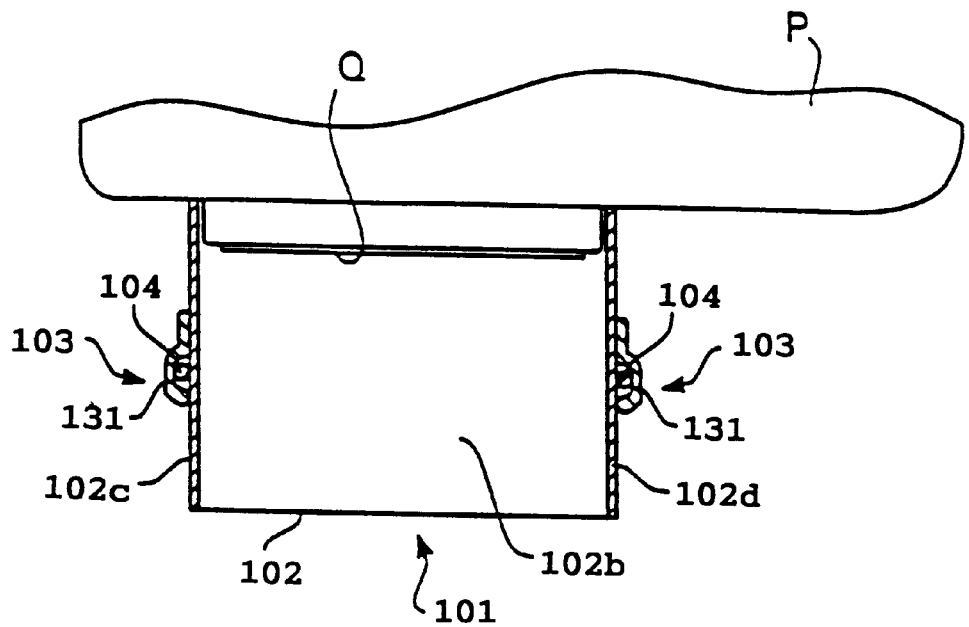
FIG. 6 is a sectional view of a fixing means for fixing the shading hood member according to the third embodiment of the invention.
Figure 7:
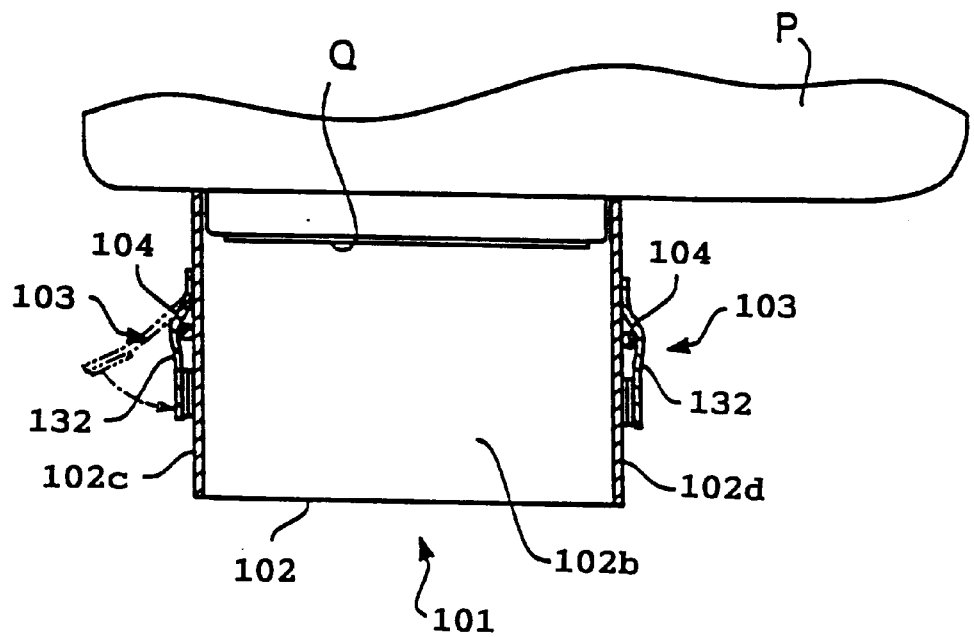
FIG. 7 is a sectional view of another fixing means of the shading hood member.
Figure 8:
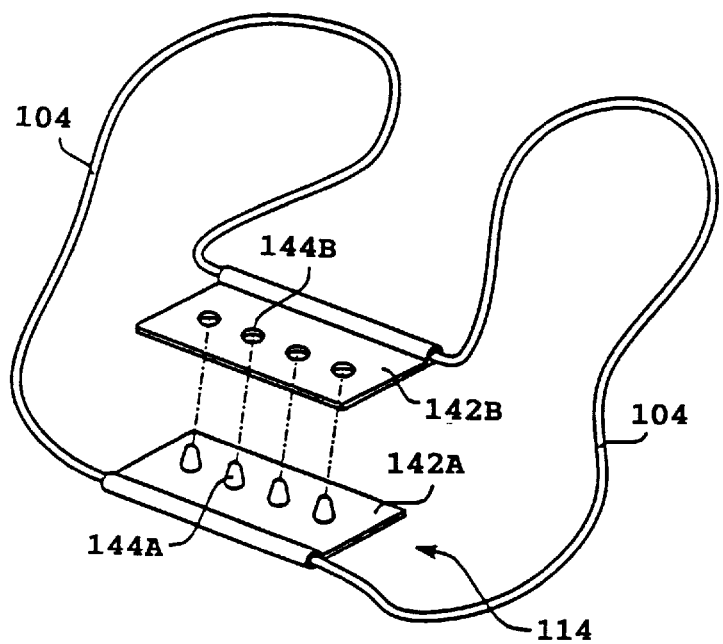
FIG. 8 is a perspective view of a connecting means.

Further, FIGS. 6 and 7 illustrate a fourth embodiment of the invention. In these figures, each of constituent parts, which are the same as those illustrated in FIGS. 1 to 5, is designated by reference character, which is the same as the reference character used for designating the same constituent part in FIGS. 1 to 5. Thus, the detailed description of such constituent parts is omitted. In the fourth embodiment, the shading hood member 101 is detachably attached to the liquid crystal monitor Q through the string members 104, which are constituted by elastic members made of a material, such as silicone rubber, fixed and attached to the shading hood member 101 like a loop, in such a manner as to cover the periphery of the liquid crystal screen of the liquid crystal monitor Q disposed on the rear surface of the camera body P. That is, the shading hood member 101 and the string members 104 are integrally formed. Moreover, the shading wall portion 102 is formed so that the entire portion constructed by respectively connecting the lateral edge portions of a nearly square like upper wall portion 102a to the lateral edge portions of a nearly transversely elongated lower wall portion 102b through nearly inverse trapezoid like left and right side wall portions 102c and 102d is shaped like a nearly rectangular cylinder. Thus, a rear-end opening surface of the shading hood member 101 is formed like a rectangle in such a way as to be parallel to the rectangular liquid crystal screen of the liquid crystal monitor and as to have a transverse section, whose contour corresponds to and matches the contour of the liquid crystal screen. Further, the shading hood member 101 is formed so that the front-end opening surface side, through which a user looks at an image, thereof is inclined slightly downwardly.

Further, a Fresnel lens 151, which has a size being equal to the area of the opening of the shading wall portion 102 and is enabled to retreat in a collapsed manner, is provided in the shading wall portion 102 of the shading hood member 101. This Fresnel lens 151 is of the known configuration in which fine circular grooves are formed in a surface portion of a plastic plate so that the entire plate serves as a lens.

Figure 9:
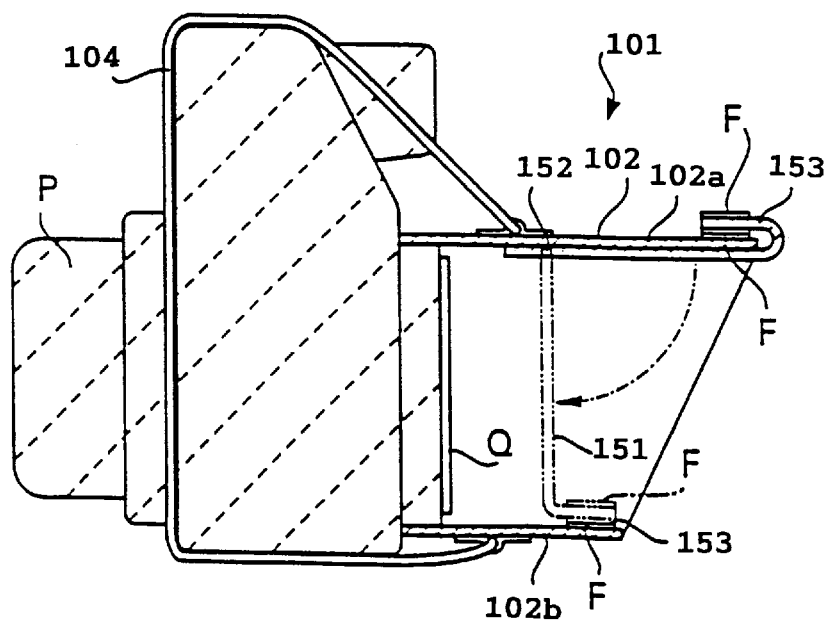
FIG. 9 is a sectional view of a fourth embodiment of the invention.
Figure 10:
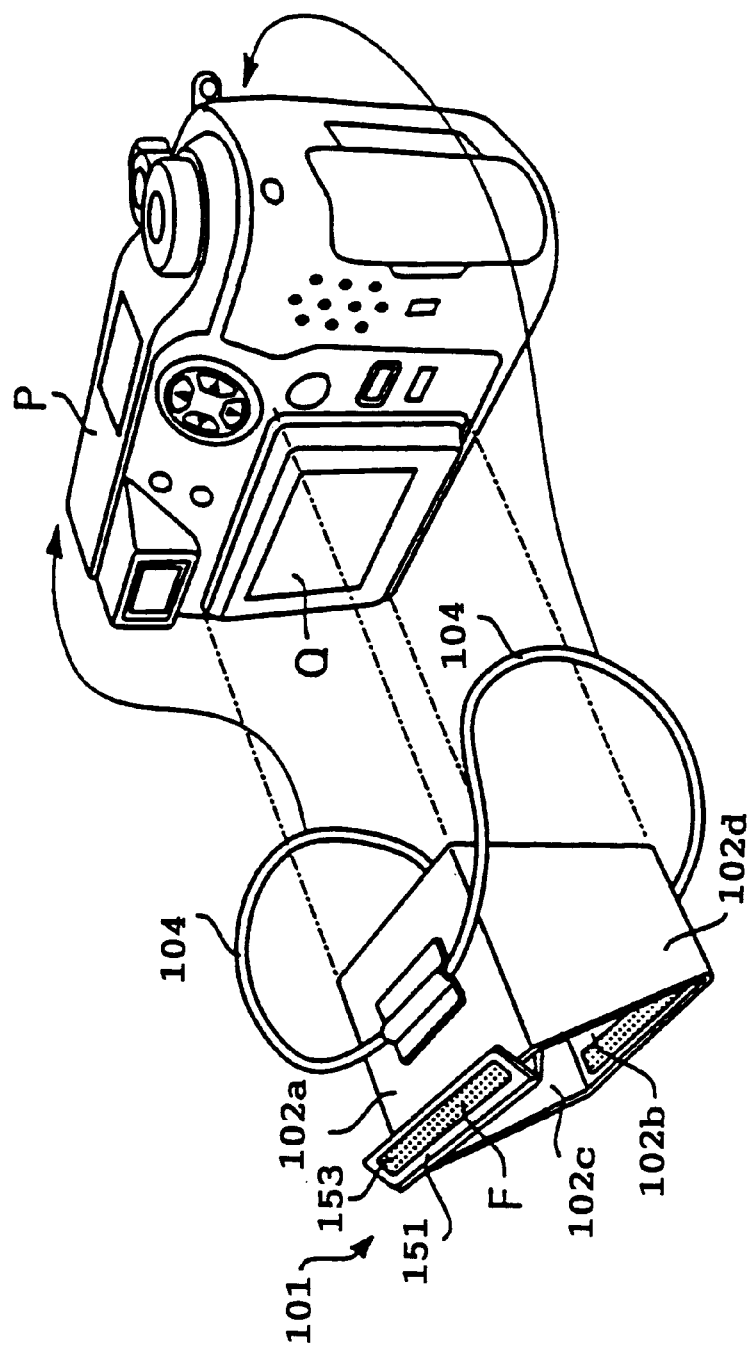
FIG. 10 is a perspective view illustrating a method of attaching a shading hood member according to the fourth embodiment of the invention.

That is, as illustrated in FIG. 9, in the shading wall portion 102, the top end portion of the rectangular Fresnel lens 151 is rotatably and pivotably mounted in the rear-end opening surface part of the upper wall portion 102a through a hinge portion 152. A frontwardly foldable fixing piece 153 is formed at the bottom end portion of the Fresnel lens 151. Moreover, one of the male and female surface fastener portions F is formed on each of the top and bottom surfaces of the fixing piece 153. When the fixing piece 153 of the Fresnel lens 151 is turned toward the lower wall portion 102b through the hinge portion 152 so that the surface of the Fresnel lens 51 faces the inside of the rear-end opening surface part of the shading wall portion 102, the surface fastener portion F of the fixing piece 153 is fixedly attached to one of the male and female surface fasteners F, which is provided on the inner surface of the lower wall portion 102b.

Meanwhile, when the Fresnel lens 151 is folded toward the upper wall portion 102a through the hinge portion 152, the fixing piece 153 is folded back still more, so that the surface fastener portion F of the fixing piece 153 is fixedly attached to one of the male and female surface fastener parts F, which is provided on the top surface of the upper wall portion 102a.

Thus, the Fresnel lens 151 provided in the shading hood member 101 serves to sharpen an image displayed on the liquid crystal screen by turning the fixing piece 153 toward the lower wall portion 102b through the hinge portion 152. Further, when the Fresnel lens 151 is not used, the Fresnel lens 151 itself is upwardly folded and retreated through the hinge portion 152 in the shading wall portion 102. Subsequently, the fixing piece 153 of the Fresnel lens 151 is folded toward the top surface side of the upper wall portion 102a and then fixedly attached to the surface fastener portion F. Thus, the liquid crystal screen can be directly seen over the shading hood member 101. Incidentally, instead of forming the surface fastener part F, a fixedly attaching portion, such as a snap fastener, a zipper slide fastener, or a hook member, may be provided.

As described above, according to the invention, there is provided a shading hood for use in a digital camera having a liquid crystal screen, which can easily be attached to a liquid crystal monitor of a digital camera of the existing type, if necessary, and which thus can be provided for all models of digital cameras and which has a simple structure and is compact in sizes, as compared with the conventional integral hood structure, and which can be manufactured at low cost and reliably shade external incident light, and which enables a plurality of persons to simultaneously see a clear image displayed on the liquid crystal screen.

That is, according to the invention, the shading hood member 101 is detachably attached to the liquid crystal monitor Q through the string members 104 stretched and wound around the camera body P in such a manner as to cover the periphery of the liquid crystal screen of the liquid crystal monitor Q openably disposed on the rear surface side of the camera body P. Consequently, for example, external strong incident light, such as sunlight, can reliably be shut out. Moreover, a plurality of persons simultaneously can see a sharp image displayed on the liquid crystal screen.

The shading hood member 101 comprises the shading wall portion 102, which is formed nearly like a rectangular cylinder having a transverse section, whose contour corresponds to and matches the contour of the rectangular liquid crystal screen of the liquid crystal monitor Q, and also comprises the fixing means 103 formed on a side surface of the shading wall portion 102 in such a way as to cause the shading wall portion 102 to abut against the periphery of the liquid crystal monitor Q and as to cause the monitor Q to hold the shading wall portion 102 itself. Thus, as compared with the conventional hood structure, the shading hood member 101 of the invention has a simple structure and is manufactured in such a manner as to be compact in size. Moreover, the low-cost shading hood member 101 can easily be provided.

The fixing means 103 is implemented by the hook claw like string member hanging portion 131 formed on the side surface of the shading wall portion 102 in such a way as to be latched and held by the string members 4 stretched and wound around the camera body P or by the surface fastener like string member pinch-pressing/holding portion 132. Consequently, the invention provides the shading hood member 101 that can easily be attached to and detached from the liquid crystal monitor Q provided on the rear surface of the camera body P, and that can easily be attached to the liquid crystal monitor Q of a digital camera of the existing type.

The string members 104 are constituted by elastic members made of silicone rubber. Thus, the deterioration of the string members 104 themselves due to water, heat or chemicals, which would deteriorate conventional vulcanized rubber, and the pollution of the camera body P itself due to transubstantiation of rubber can be prevented.

The string members 104 have the connecting means 141, each of which is a fixedly attaching structure, such as surface fastener, a snap fastener, a zipper slide fastener, or a hook member, in such a way as to connect both end portions of one of the string members 104 to both end portions of the other string member 104, respectively, by being stretched and wound around the camera body P. This facilitates the attachment of the string members 104 to the liquid crystal monitor Q and the detachment of the string members 4 from the monitor Q.

The shading hood member 101 is detachably attached to the liquid crystal monitor Q disposed on the rear surface side of the camera body P through the string members 104 attached and fixed to the member 101 like a loop in such a way as to cover the periphery of the liquid crystal screen of the monitor Q. Moreover, elastic members made of silicone rubber constitute the string members 104. Thus, the invention provides the shading hood member 101 that facilitates the attachment of the shading wall portion 102 to the liquid crystal monitor Q and the detachment of the portion 102 from the monitor Q.

The shading hood member 101 has the Fresnel lens 151 enabled to retreat in a collapsed manner. The use of the Fresnel lens 151 enables users to see a sharp image displayed on the liquid crystal screen. When the Fresnel lens 151 is not used, the liquid crystal screen can be directly seen over the shading hood member 101 by retreating the Fresnel lens itself in a collapsed manner in the shading wall portion 102.

The shading hood member 101 is configured in such a manner as to be able to be held in the camera body P through the strap 161. Thus, the loss of the shading hood member 101 itself can be prevented. Moreover, the shading hood member 101 is formed in such a way as to be portable.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A shading hood for a digital camera having a liquid crystal screen, said shading hood for a liquid crystal monitor, which is adapted to cover a periphery of the liquid crystal screen of said liquid crystal openably provided on an outside surface of a camera body, comprising:

a shading wall portion formed nearly like a rectangular cylinder having a transverse section, whose contour corresponds to and matches a contour of said liquid crystal screen, which is shaped like a rectangle, of said liquid crystal monitor;

a lens provided in said shading wall portion in such a way as to be able to retreat in a collapsed manner; and fixing means including a holding/abutting surface portion for hanging across a rear surface of said liquid crystal monitor, which is formed at an opening end side of said shading wall portion in such a way as to allow said liquid crystal monitor to hold said shading wall portion itself, wherein said shading wall portion is detachably attached to said liquid crystal monitor through said fixing means.

2. A shading hood for a digital camera having a liquid crystal screen according to claim 1, wherein said holding/abutting surface portion of said fixing means is formed by connecting an upper holding/abutting surface portion, which is extended from an upper wall surface, and a lower holding/abutting surface portion, which is extended from a lower wall surface, at the opening end of said shading wall portion through a connecting means having a fixedly attaching structure that is annexed to an end edge of each of upper and lower holding/abutting surface portions and that is one of a surface fastener, a snap fastener, a zipper slide fastener, and a hook member.

3. A shading hood for a digital camera having a liquid crystal screen according to claim 2, wherein said fixing means includes one of a hook like string member hanging portion and a surface-fastener-like string-member pinch-pressing/holding portion formed on a side surface of said shading wall portion in such a manner as to be latched and held by a string member stretched and wound around said camera body.

4. A shading hood for a digital camera having a liquid crystal screen according to claim 3, wherein said string member is formed from an elastic member made of silicone rubber.

5. A shading hood for a digital camera having a liquid crystal screen according to claim 1, wherein the lens is a Fresnel lens.

6. A shading hood for a digital camera having a liquid crystal screen, said shading hood for a liquid crystal monitor, which is adapted to cover a periphery of the liquid crystal screen of said liquid crystal openably provided on an outside surface of a camera body, comprising:

a shading wall portion formed nearly like a rectangular cylinder having a transverse section, whose contour corresponds to and matches a contour of said liquid crystal screen, which is shaped like a rectangle, of said liquid crystal monitor;

a lens provided in said shading wall portion in such a way as to be able to retreat in a collapsed manner; and fixing means, formed on a side surface of said shading wall portion, in such a way as to cause said shading wall surface itself to abut against a periphery of said liquid crystal monitor through a string member stretched and wound around said shading wall portion and to be held thereon, wherein said shading wall portion is detachably attached to said liquid crystal monitor through said string member stretched and wound around said camera body.

7. A shading hood for a digital camera having a liquid crystal screen according to claim 6, wherein said string member is formed from an elastic member made of silicone rubber.

8. A shading hood for a digital camera having a liquid crystal screen according to claim 6, wherein the lens is a Fresnel lens.

\* \* \* \* \*